J. Tingley. — Improved Ice Cream Freezer.
No. 74259
PATENTED
FEB 11 1868
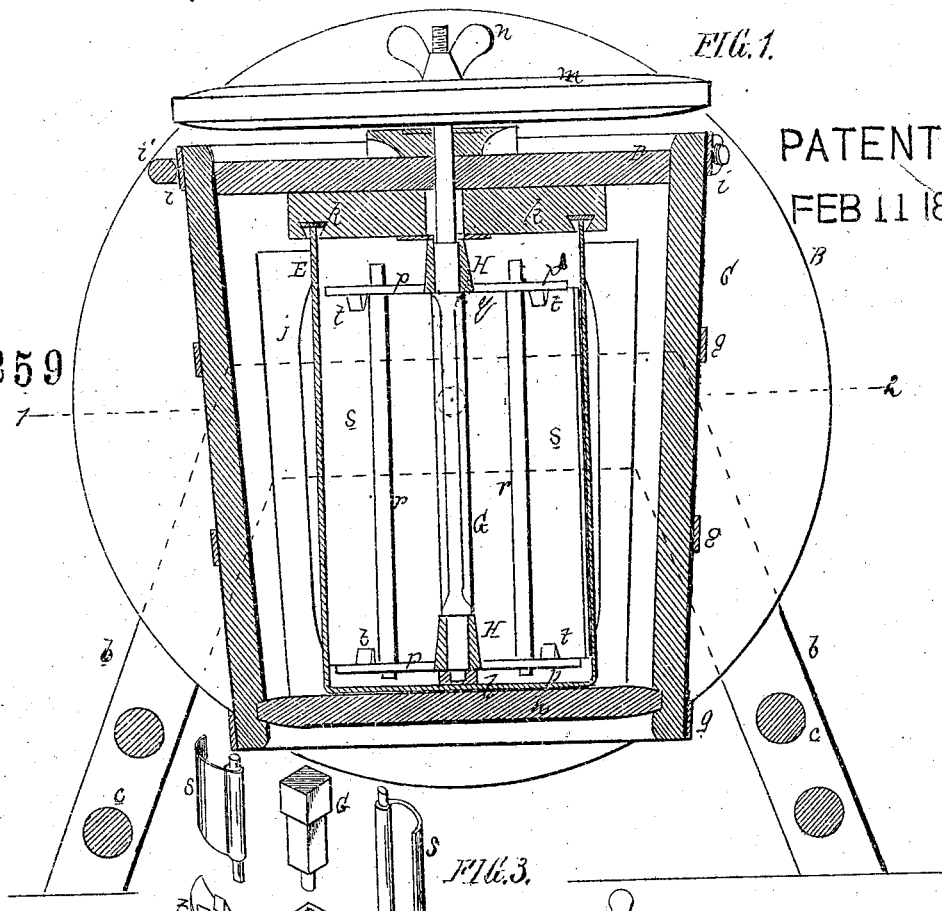
FIG. 1.
FIG. 3.
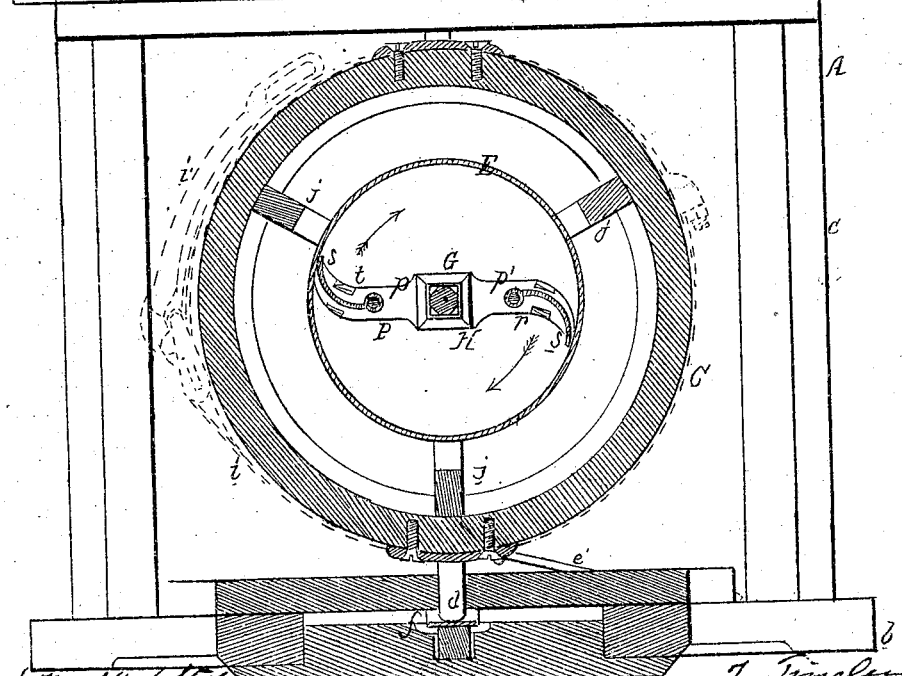
FIG. 2.
Witnesses:  J. Tingley

United States Patent Office

JOHN TINGLEY, OF PHILADELPHIA, PENNSYLVANIA.

*Letters Patent No. 74,259, dated February 11, 1868.*

---

IMPROVED ICE-CREAM FREEZER.

---

*The Schedule referred to in these Letters Patent and making part of the same.*

---

TO ALL WHOM IT MAY CONCERN:

Be it known that I, JOHN TINGLEY, of Philadelphia, Pennsylvania, have invented an Improved Ice-Cream Freezer; and I do hereby declare the following to be a full, clear, and exact description of the same.

My invention consists, firstly, of an ice-cream freezer, in which an outer vessel containing the ice, and an inner vessel containing the cream, as well as the dasher within the latter, are turned in one direction, while the dasher is at the same time rotated within the vessel, the cream being by this means thoroughly agitated and exposed to the ice contained between the two vessels; and my invention consists, secondly, of a dasher constructed in the peculiar manner fully described hereafter, for effectually scraping the frozen cream from the vessel, and for ready removal from the same.

In order to enable others to make and use my invention, I will now proceed to describe its construction and operation, reference being had to the accompanying drawing, which forms a part of this specification, and in which—

Figure 1 is a sectional elevation of my improved ice-cream freezer.

Figure 2, a sectional plan view on the line 1 2, fig. 1, and

Figure 3 a detached perspective view, showing a portion of my invention.

The frame, A, of the freezer consists of two stands, $b$ and $b'$, and to the stand $b'$ is secured a large disk, B, in the centre of which is a bearing for one of the trunnions, $d$, of a vessel, C, the opposite trunnion, $d'$, of the said vessel turning in a suitable bearing on the stand $b$ of the frame. These trunnions are secured to the sides of the vessel C at a point about midway between the opposite ends of the same, and at the outer end of the trunnion $d$ is a crank, $e$, by means of which the vessel is turned, a spring, $f$, bearing against the end of the trunnion $d'$, for a purpose described hereafter. The staves forming the sides of the vessel C are bound together by the usual hoops, $g$, and the detachable top or cover D is secured to the vessel by means of the tightening-band $i$, the opposite ends of which can be drawn together by operating a curved cam-lever, $i'$, as shown by dotted lines, fig. 2, thus tightening the staves of the vessel, and causing them to gripe the edge of the cover D, as described in the patent granted to me on the eleventh day of August, 1863.

The vessel C is held in the vertical position shown in fig. 1, and prevented from turning on the frame by a hook, $e'$, on the stand $b$, entering a staple at the lower end of the vessel. Within the vessel C, and resting upon the bottom of the same, is placed an inner vessel, E, of tinned iron, zinc, or other thin metal, which is adjusted to a central position, and prevented from moving laterally in the outer vessel by means of three or more projections, $j$, in the latter, as shown in fig. 2. The vessel E is prevented from moving longitudinally within the vessel C by means of the cover D, which bears upon the wooden cover $k$ of the inner vessel, the contents of which are prevented from escaping by means of a gum ring, $k'$, which intervenes between the vessel and its cover, as shown in fig. 1. A spindle, G, turns in the cover D, and in a step, $l$, at the bottom of the vessel F, a friction-wheel, $m$, being secured to the outer end of the spindle by a nut, $n$, in such a manner as to be readily detached. The wheel $m$ is in the present instance edged with gum-elastic, and is caused to bear against the disk B by the spring $f$ of the trunnion $d'$, so that when the vessel C is turned the wheel $m$ and spindle G will revolve. If desired, instead of the friction-gear above described, a cog-wheel gearing into teeth on the face of the disk B may be substituted for the wheel $m$.

The lower squared portion of the spindle G passes through a square socket, H, which rests upon the step $l$ at the bottom of the vessel E, and has two projecting curved arms, $p$ and $p'$, (see fig. 3,) and a similar socket, H', rests upon a shoulder, $q$, of the spindle, near to the opposite end of the vessel E. A spindle, $r$, is arranged to turn in the opposite arms $p$, and a similar spindle in the arms $p'$, and from each of the spindles projects a curved vane or scraper, $s$, of a length equal to the distance between the arms in which its spindle turns; and the motion of the scrapers is limited by lugs, $t$, projecting from each of the arms $p$ and $p'$, as clearly shown in the perspective view, fig. 3.

The scrapers $s$ are made of thin sheet metal, and are so curved that they shall be elastic and adapt themselves to the sides of the vessel E.

The vessels C and E are turned upon their trunnions by the crank $e$, and at the same time, by means of the wheel $m$, the spindle G and dasher within the vessel F are caused to rotate in the direction of the arrows, fig. 2. By this combined motion, the cream contained in the vessel E is thrown from end to end of the latter, and driven around it by the action of the revolving dasher, the whole of the mass of cream being thus thoroughly agitated and exposed to the action of the ice contained in the annular space between the two vessels. The scrapers $s$ are, by the weight of the mass in front of them, forced backward until they are in close contact with the sides of the vessel E, from which the frozen portion of the cream in thus scraped and thrown towards the centre of the vessel to make way for the fluid portion of the mass, which is in turn frozen and scraped from the sides until all the cream has been reduced to the proper state.

The above process is rapid and effectual, the cream being so thoroughly agitated during the operation that the frozen cream is uniform and free from lumps.

As soon as the operation is completed, the apparatus is secured in the upright position shown in fig. 1, the nut $n$ loosened, and the wheel $m$ removed. The cam-lever I' is then turned outwards, and the covers are removed from the vessels C and E, after which the socket H' is removed from the latter vessel, and the spindle G and scrapers are drawn vertically from the mass of frozen cream. The spindle G and the scrapers are free from projections, and very little, if any, of the frozen material adheres to them as they are drawn out, an advantage which is possessed by my invention over the dashers in common use, which are generally cast in one piece. After the withdrawal of the spindle and scrapers, the frozen cream may be taken from the vessel as it is required for use, the lower socket H remaining at the bottom until the greater part of the cream has been removed, when it may be withdrawn and cleaned preparatory to the second filling of the vessel with cream to be frozen.

I claim as my invention, and desire to secure by Letters Patent—

1. The vessel E, its dasher-spindle G, and wheel $m$, in combination with the outer revolving vessel C and the stationary disk or wheel B, the whole being constructed and arranged for joint action, substantially as and for the purpose herein set forth.

2. The within-described dasher, composed of arms $p$ and $p'$, adapted to the spindle G and elastic scrapers $s$ on spindles hung to the said arms, all substantially as and for the purpose herein set forth.

In testimony whereof, I have signed my name to this specification in the presence of two subscribing witnesses.

JOHN TINGLEY.

Witnesses:
 JOHN WHITE,
 W. J. R. DELANY.